(No Model.) 6 Sheets—Sheet 1.

E. P. HOLLY.
CASH REGISTER.

No. 498,793. Patented June 6, 1893.

Witnesses:
Rosa M Holly
Anna May Holly

Inventor:
Edgar P Holly (No Model.) 6 Sheets—Sheet 2.
E. P. HOLLY.
CASH REGISTER.
No. 498,793. Patented June 6, 1893.
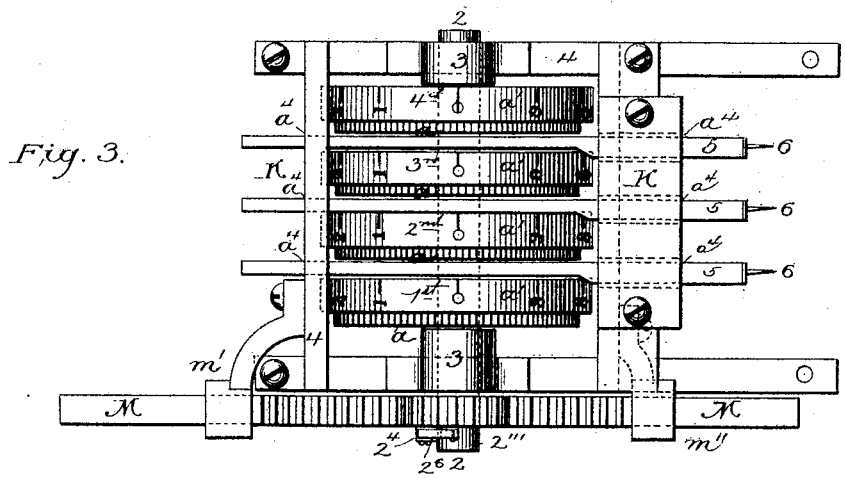
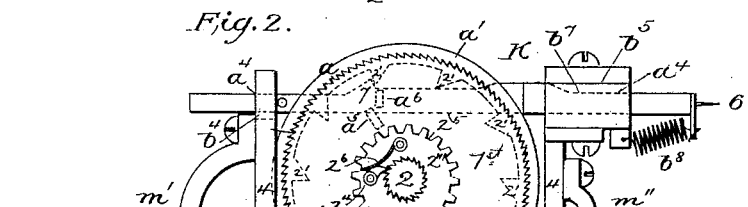
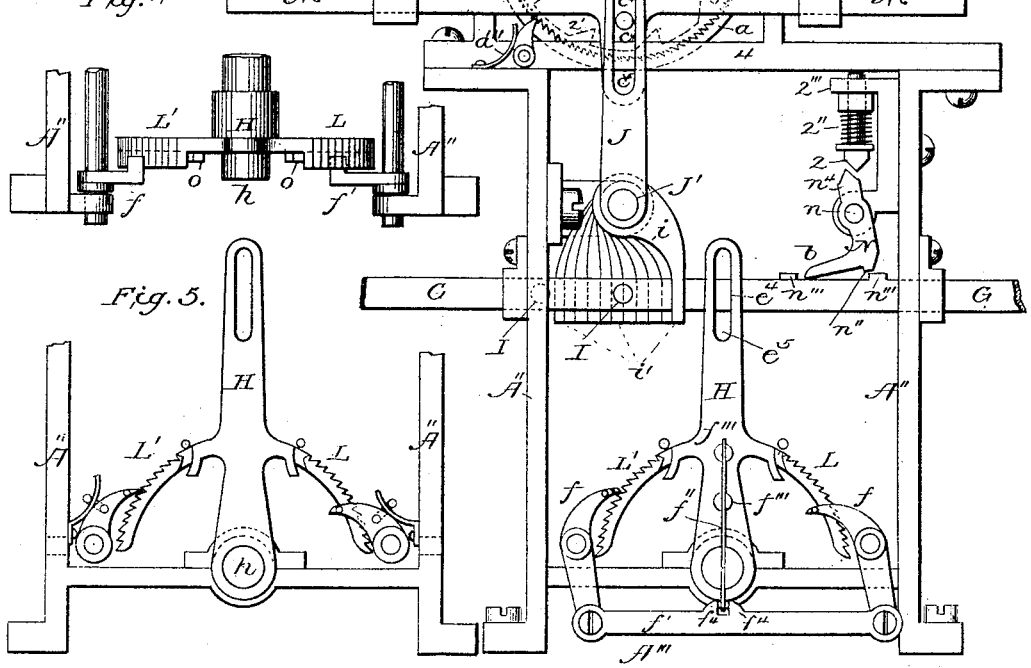
Witnesses:
Rosa M. Holly
Anna May Holly
Inventor:
Edgar P. Holly (No Model.) 6 Sheets—Sheet 3.
E. P. HOLLY.
CASH REGISTER.

No. 498,793. Patented June 6, 1893.

Witnesses:
Rosa M Holly
Anna May Holly

Inventor:
Edgar P Holly (No Model.) 6 Sheets—Sheet 4.
E. P. HOLLY.
CASH REGISTER.
No. 498,793. Patented June 6, 1893.
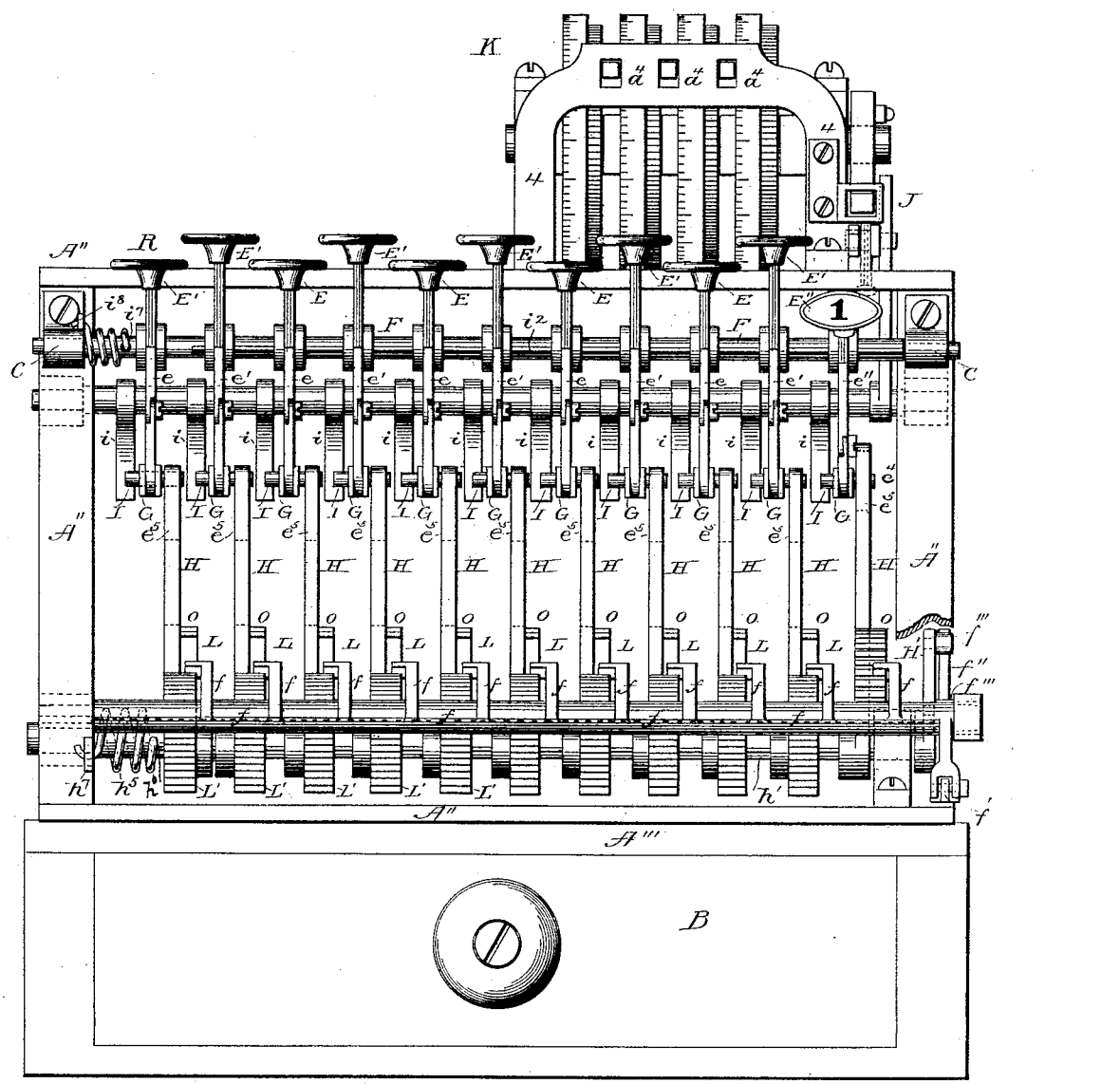

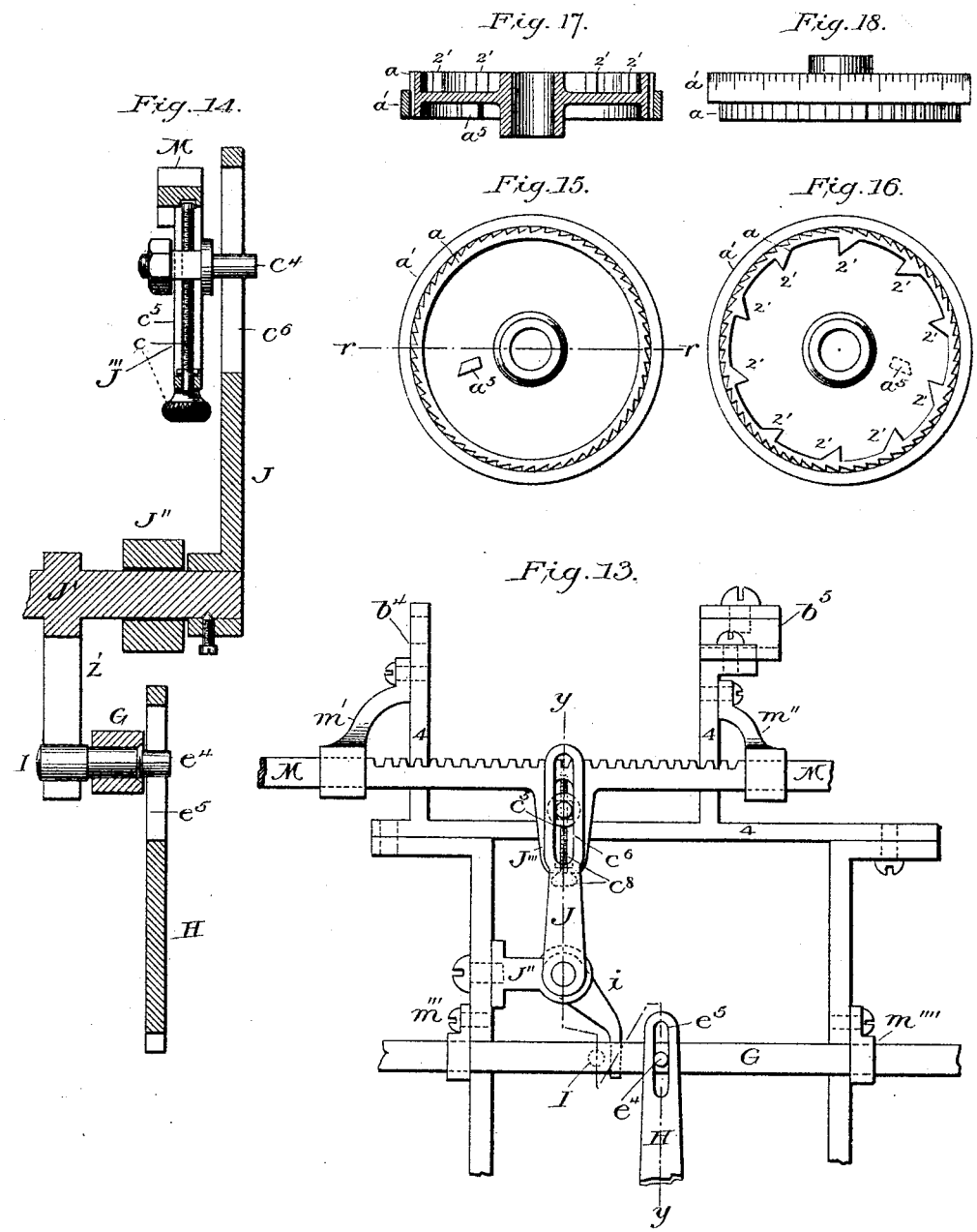

(No Model.) 6 Sheets—Sheet 6.
E. P. HOLLY.
CASH REGISTER.

No. 498,793. Patented June 6, 1893.

Witnesses:
Rosa M. Holly
Anna May Holly

Inventor:
Edgar P. Holly

UNITED STATES PATENT OFFICE.

EDGAR P. HOLLY, OF SPRINGFIELD, MASSACHUSETTS, ASSIGNOR TO HIMSELF AND ALVIN M. CUSHING, OF SAME PLACE, AND WILLIAM B. C. PEARSONS, OF HOLYOKE, MASSACHUSETTS.

CASH-REGISTER.

SPECIFICATION forming part of Letters Patent No. 498,793, dated June 6, 1893.

Application filed June 8, 1892. Serial No. 436,024. (No model.)

*To all whom it may concern:*

Be it known that I, EDGAR P. HOLLY, a citizen of the United States, residing at Springfield, in the county of Hampden and State of Massachusetts, have invented a certain new and useful Improvement in Cash Registers and Indicators, of which the following is a specification.

My invention relates to that class of machines known as cash registers and indicators and consists of the mechanism and devices which form the improvement hereinafter described and claimed.

Its object is to indicate and record the amount of cash paid by a purchaser of goods of any kind.

Said device embraces a series of keys which are operated by the salesman, corresponding with and severally designated by the unit and its multiples, by which cash payment to be made may be noted, an indicating device corresponding in its several parts with the keys and bearing like numbers by which the keys are designated, said numbers being exposed to sight by the depression of a key corresponding with the number desired, a means to prevent the operation of more than one key at the same time and to retain in view the number exposed until another key is depressed.

I am aware that a number of cash registers have been and are being manufactured, and the object of my improvement is to produce the same results by a combination of devices that are new, and to cheapen the cost of the machine and secure reliability, durability and accuracy to a greater extent than has hitherto been accomplished. The above results are obtained by the mechanical construction infolded in my improvement as hereinafter described and claimed.

Figure 1:
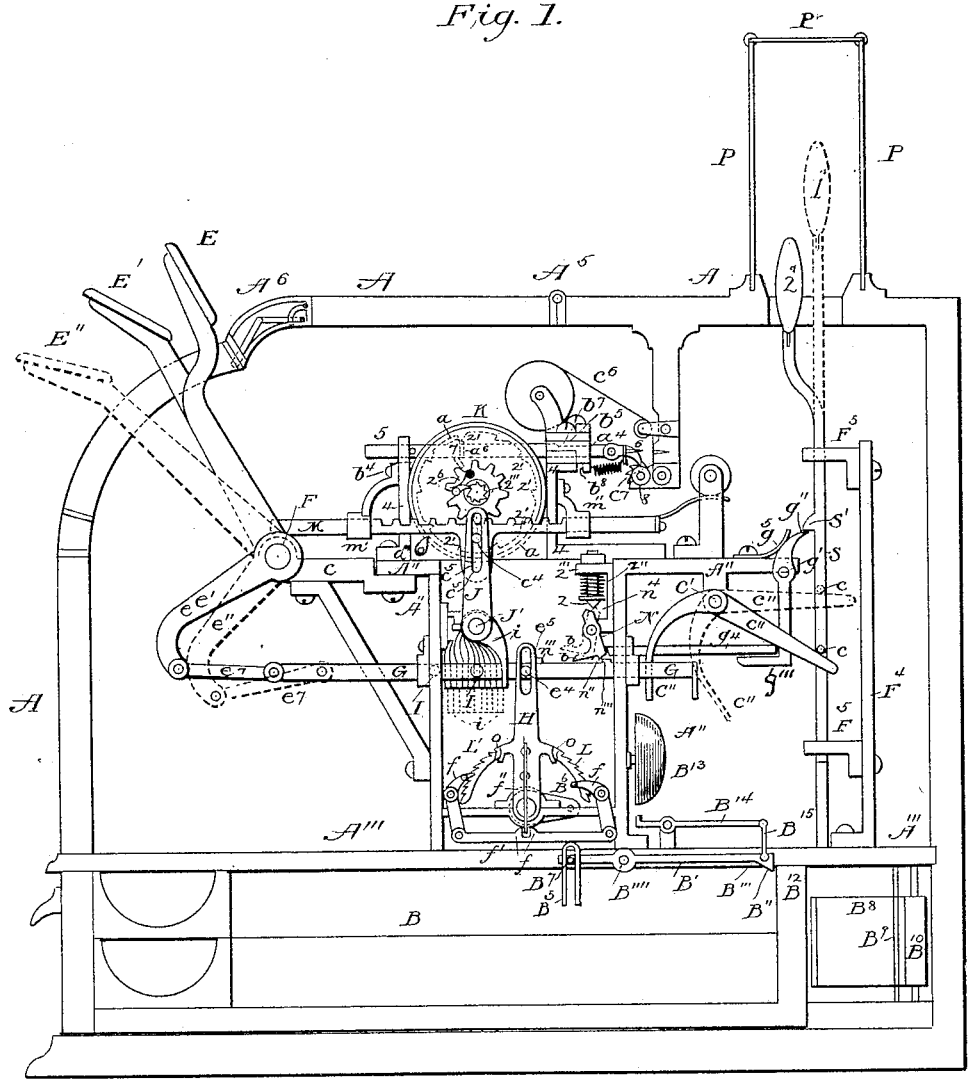
Figure 7:
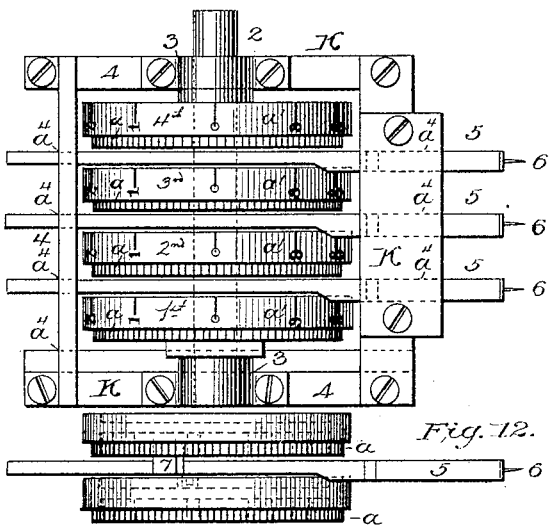
Figure 8:
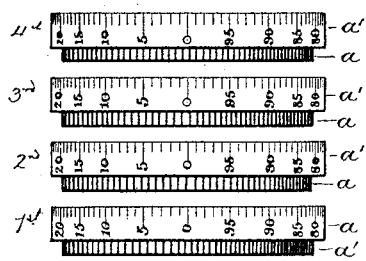
Figure 9:
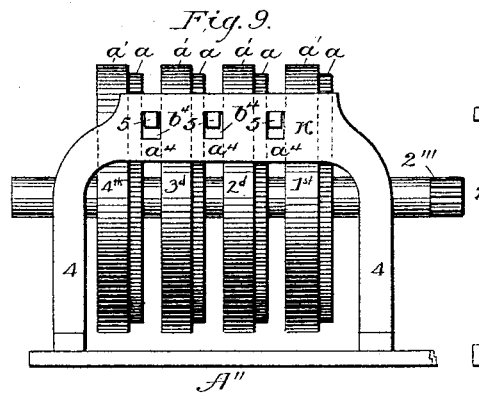
Figures 6, 12:
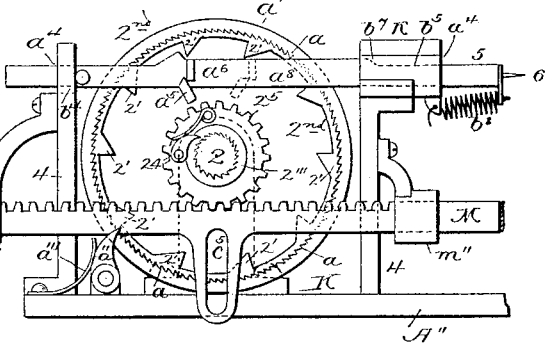
Figure 10:
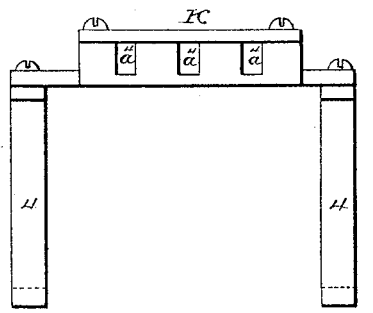
Figure 11:
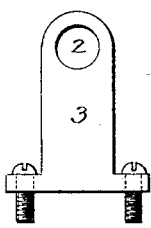
Figure 19:
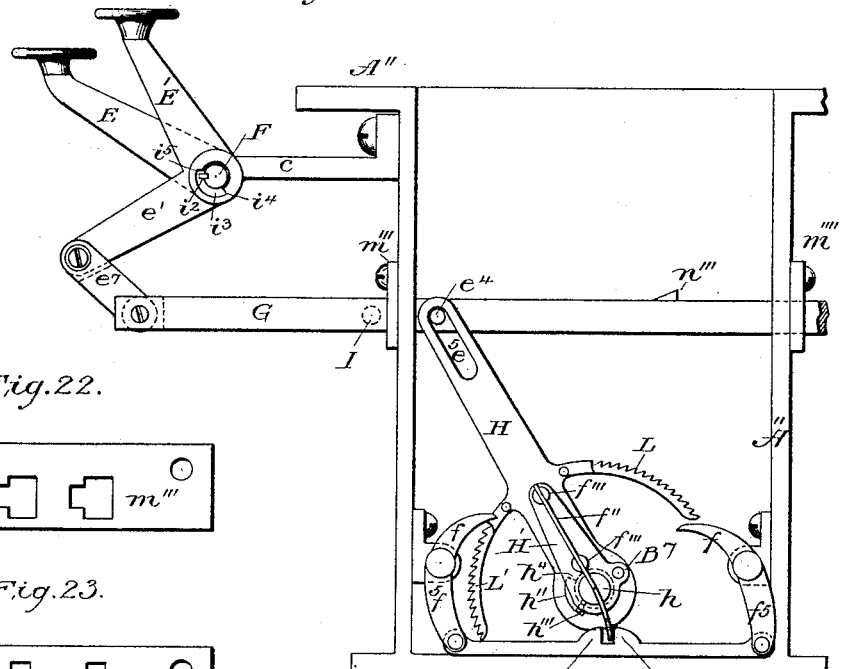
Figure 22:
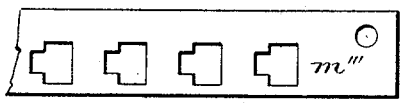
Figure 23:
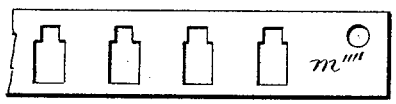
Figures 20, 21:
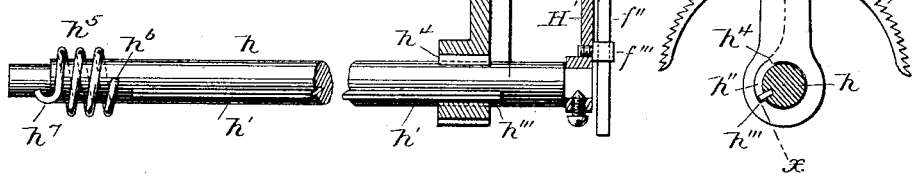

In the accompanying drawings on six sheets, Figure 1 is a side elevation of my improvement showing the operation from the movement of the several keys, the exposing of sale and the registration of the same. Fig. 2 is a side elevation which shows the check arms and connections through to register. Fig. 3 is a plan view of Fig. 2 and shows the relation of Fig. 2 to the recording or registering machine. Fig. 4 is a plan of a check movement for key bars. Fig. 5 is a vertical elevation of Fig. 4, and shows a means to accomplish the results attained in Fig. 2. Fig. 6, Sheet 3, is a side elevation of register or adding machine and shows an internal view of one registering wheel. Fig. 7 is a plan of Fig. 6 and shows the relative arrangement of a train of adding wheels and frame. Fig. 8 is a plan of a train of wheels graduated into hundreds, or one hundred equals one revolution. Fig. 9 is an elevation of front side showing the lateral position of rolls on shaft, also form of frame, position of guides for ratch bar, &c. Fig. 10 is an elevation of the rear side, and shows that side of frame and ratch bar guide. Fig. 11 is a vertical front elevation of the bearing in which register shaft revolves. Said bearings, two in number, are bolted (one at or near each end of shaft), to base of register frame and locate or fix the position of shaft relatively with ratch bar and frame. Fig. 12, Sheet 4 is a front view and shows the lateral position of keys, key bars, check arms, shafts and all parts displayed in Fig. 1. Fig. 13, Sheet 5, is a side view showing connections of key bars with rack bars and the means of adjusting the horizontal movement of said rack bars. Fig. 14 is a section through line $y\,y$ of Fig. 1. Figs. 15, 16, 17 and 18 show respectively a rear view, a front view, a section through line $r\,r$ of Fig. 15, and a plan of one of the registering wheels of the adding machine. Fig. 19, Sheet 6, is a side elevation showing the connection of keys to key bars, key bars to check arms, also connecting pawls and actuating spring, also position of each alternate key. Fig. 20 is a front view of the shaft on which the check arms are mounted, also one of said arms in section through line $x\,x$, Fig. 21, also the arm and studs carrying the actuating spring for connected pawls. Fig. 21 is a vertical elevation of one of the check arms and a section of shaft on which it is mounted. Fig. 22 is a front view of a portion of key bar guide, showing openings in which key bar rests. Fig. 23 is a similar view of the rear guide for key bars.

Similar letters and figures have reference to like parts throughout the several views.

In Fig. 1 A A A is the case or cabinet for machine and is substantially of the usual form, embracing the registering and indicating devices in the usual manner, provided with a glass housing, inside of which the indicating signals are displayed. In the lower portion of the case is the cash drawer B, held in closed position by the stop B″ which holds and relieves said drawers as the keys are operated. The numbered keys E E′ (outside of case), are substantially of the common form, and are loosely pivoted on a common fulcrum shaft F, which is supported in bearings C C secured to the frame of the machine A. The keys are guided in vertical slots in case A in the usual manner, and the numbered finger ends of the same are alternately located one above and back of one below, in order to reduce the length of cabinet A, as the finger ends are much wider than the lever portion of key. The lower keys are marked E, the upper part E′ as shown in their normal positions.

A″ A″ is the frame of the machine and is bolted to the cast iron base A‴.

All working parts are attached to frame A″ or base A‴.

In Fig. 1, E″ represents the position of one of the keys E if one half of its stroke E′ has been effected, consequently the operating mechanism, Figs. 1 and 2, Sheets 1 and 2; and Fig. 13, Sheet 5, is shown on vertical center lines. Each key is curved down at fulcrum at an angle of about ninety degrees with finger ends as shown at $e\ e'\ e''$ and connected with a horizontal sliding key bar G by the connecting link $e^7$. This key bar extends horizontally through frame A″ A″ supported in guides $m'''\ m''''$ at front and rear of frame. There may be eleven keys, or twenty-two or more, as the range of work required to be done demands. A key E′ Fig. 1, has been moved one-half its stroke as shown by E″, and has carried the check arm H by the pin $e^4$ which projects from one side of the key bar G and through the long slot $e^5$ at the upper end of each check arm H, pivoted at its lower end on a shaft $h$ and capable of motion from front to rear and from rear to front. About midway between the slot $e^5$ and the shaft $h$ on each check arm are two toothed sectors L and L′, forming a part of each check arm, and extending in opposite directions from said arm, and provided with ratchet teeth cut laterally across their surfaces in opposite directions, those on sector L directed to the rear, those on sector L′ directed to the front. A long pawl or dog $ff$ is placed at each side of the check-arm H, and their upper ends provided with a laterally projecting tooth which will respectively engage with the teeth of the sectors L L′. The pawls extend longitudinally through the frame and are supported in bearings attached thereto. They may consist of a series of pawls rigidly connected with shaft, or may be all cast on or form a part of shaft. An arm $f^5$ extends down from end of each pawl (or series of pawls $ff$) and are connected together by the connecting bar $f'$ in the center of which are two rising abutments $f^4 f^4$ facing each other and but a narrow space between them, and are directly under the end of shaft $h$ and a short distance from it. At the end of shaft $h$ is a short vertical arm H′ which is provided with two projecting slotted studs $f''''\ f''''$. The slots are aligned with each other and a short, flat spring $f''$ is entered and secured in said slots, the lower end extending down into the space between the abutments $f^4 f^4$, on the bar $f'$, said abutments to receive the side thrust of spring $f''$ toward the front or rear. The ratchet teeth are only cut a certain distance on each sector L, L′, and so far as they are cut project laterally in front of the arm H, as shown in Fig. 17, Sheet 4. Where they terminate a free passage O is left for the engaging pawls $ff$ to pass from the outside to the inside or from the inside to the outside of sectors L L′. Now it will be seen that as the check arm H is moved to the rear by its companion key E or E′ and its key bar G, the pawl $f$ on the front or sector L′ will successively engage with all the teeth on that side, and the pawl $f$ at the rear will assume a position under or below the teeth of sector L. As soon as the check arm H has completed its stroke the pawl $f$ on the front or sector L′ (owing to the pressure exerted by the spring $f''$), will fall below the teeth of said sector to the inside, as it will have cleared the series of ratchet teeth, and the pawl $f$ at the rear will ascend through the passage O, and as the check-arm is returning to its original position, will successively engage all the teeth of sector L. As long as said check arm is returning to its normal position the teeth of sector L will pass under the pawl $f$, but the said pawl would at once prevent a forward movement until the particular check arm is restored to its normal position and the said pawl disengaged by falling below.

The pawls $ff$ consist of two series forming a part of or rigidly secured to the axis on shaft, and engage with all the sectors L L′, their object being to prevent the depression of any key more than once until it is fully depressed, and to prevent it again being depressed until fully restored to its original position. The shaft $h$ extends longitudinally through lower central portion of frame and is supported in bearings at or near each end which may form a part of frame, or bolted securely thereto. It has a long key $h'$ fitted into its surface longitudinally with shaft, and in length equaling the space occupied by all but one of the check arms H, as shown by Fig. 12, Sheet 4 and by Fig. 20, Sheet 6. This key $h'$ projects a short distance above the surface of shaft $h$, the remaining portion of its width being firmly embedded in the said shaft. The hub of check arm H is bored to fit easily on shaft $h$. An annular recess or wide keyway $h''$, Fig. 21, Sheet 6, is cut laterally through the hub of each check arm about one-third the circumference of the bore and in depth corresponding with the distance that the key $h'$ projects above the surface of shaft $h$. This recess is cut in exactly the same position in all check arm hubs, so that when placed on the shaft $h$ the sides or wall $h'''$ $h^4$ of recess $h''$, as well as the arms H will all correctly align, the key $h'$ occupying but a small portion of the recess $h''$.

At one end of the shaft $h$ and surrounding it for a short distance, is a light coil spring $h^5$, Fig. 12, Sheet 4, and Fig. 20, Sheet 6. The coil of this spring is of a diameter to allow it to fit loosely on shaft $h$. The end toward the check arm is secured to shaft at $h^6$ by passing it through a hole in shaft $h$ or in any other manner whereby it may be securely attached to said shaft; the other end or the end next the frame is passed through and secured in a lug $h^7$, Fig. 12. The tension of spring $h^5$ is directed to hold the (by means of the key $h'$), check arms H all back in the position shown by Fig. 19, Sheet 6, said key resting against side $h'''$ of all recesses $h''$. As a key is depressed, its companion key bar G and check arm H will be carried forward and the side $h'''$ of recess $h''$ will engage with key $h'$ and revolve the shaft $h$ with it, the key $h'$ passing through the space of recesses $h''$ in all other check arm hubs, to or near the side $h^4$ of said other recesses, and all keys E E' will remain in their normal positions except the particular key that is being operated. As soon as the stroke of the operating key is completed the pawl $f$ on sector L' will disengage with that side and the spring $h^5$ will bring shaft $h$, check arm H, key bar G and key E or E' back to the starting point. Each check arm carries the shaft $h$ with it and said shaft in making this portion of a revolution, opens the cash drawer, rings the alarm bell and throws the pawls $ff$ in the direction necessary for the perfect performance of their duties. The fulcrum shaft F on which the keys E and E' are pivoted is also provided with the same returning device, consisting of the key $i^2$ in fulcrum shaft F, recesses $i^3$ in key bar hubs, sides $i^4$ and $i^5$ of recesses, spring $i^6$, attachment $i^7$ with fulcrum shaft F, and attachment $i^8$ with frame A'' of machine. This device as applied to shaft F, performs the same office as explained in connection with shaft $h$, viz: to bring back to its original position any one of the series of keys (embraced in the machine), after it has been fully depressed.

The mechanism to operate the register or adding device consists of the following parts: A lever shaft J' is located above and extends horizontally from one end of frame A'' to the other end at a right angle with all the key bars G. This shaft J' is mounted on bearings J'' which are attached to the inside of frame A'', and at each end of the same an arm J is attached to front end of shaft J' and extends upward to the register K; said register consists of a train of two or more registering wheels marked 1st, 2nd, 3rd, 4th; Sheet 3, Figs. 6, 7, 8, 9, 10. These wheels are mounted on shaft 2 and all revolve loosely on said shaft excepting the first one (1st), which is securely attached to shaft 2; said shaft is supported in bearings 3 3 attached to base of register frame 4, 4, 4, which embraces all parts of the register.

I have shown the register K to consist of four registering wheels, but I am not confined to this number, as they may be continued so as to be read into thousands and hundreds of thousands.

The registering wheels are about two inches in diameter, the rim about three-eighths of an inch wide, the web or the metal connecting hub and rim, about one-eighth of an inch thick. This portion extends from hub to center of rim, and therefore leaves the said rim projecting on each side about one-eighth of an inch. Projecting down or toward center from inner side of rim on front side, are ten or more angular ratchet teeth $2'$. $2'$, $2'$, &c. They project a short distance, their faces parallel with a line drawn through center of hub Fig. 16, Sheet 5. On the opposite side is a single projecting stud $a^5$. This extends from web of wheel to a point even with edge of rim. The rim of each wheel has fine ratchet teeth cut transversely with rim its entire circumference, and is partially covered by a graduated ring or dial $a'$ covering but one-half the surface; the ratchet teeth on the remaining portion of the rim directed toward a dog or pawl $a''$, one dog or pawl $a''$ for each registering wheel, $a$. This dog or pawl $a''$ is operatively connected with frame 4 in such a position that its engaging end will successively engage with all the teeth of its companion registering wheel, and its engagement maintained by a pressure of the spring $a'''$. The object of this dog or pawl $a''$ and ratchet teeth on wheel is to prevent a reverse movement of any wheel comprised or included in the registering train, see Figs. 6—7—8—9—10—15—16—17—18.

The space between bearings 3, 3 is occupied by the train of registering wheels. The shaft 2 projects a distance through the front bearing 3 and to receive a pinion $2^5$ terminating a short distance in front of pinion; from the end of shaft 2 to face of pinion there is cut ratchet teeth $2'''$, which engage with a pawl $2^4$ forming a part of the pinion $2^5$. The pawl is held in engagement with ratchet teeth at end of shaft 2 by the spring $2^6$. The pinion $2^5$ is not keyed to shaft 2, and is free to revolve in either direction. When carried in a forward direction the pawl $2^4$ engages with ratchet teeth $2'''$ and carries shaft 2 with it. When moving in a reverse direction the registering wheel will be retained by the pawl $a''$, and the pawl $2^4$ will pass over the ratchet teeth $2'''$ until the reverse movement is completed.

The pinion $2^5$ has ten or more regular cog teeth cut on its periphery and matches or works in connection with a rack bar M which lies horizontally across one end of frame 4 and directly under the said pinion. This rack bar M has also regular cog teeth cut across its upper side, corresponding with and in number the same as on the periphery of pinion $2^5$. It is supported in guides $m'$ $m^2$, secured to outside of frame 4. It lies in the same vertical plane with pinion $2^5$, and it has a longitudinal movement. In the center of this ratch bar M is a depending arm $J'''$ containing a vertical slot $c^5$ in which is fitted a movable stud $c^4$. This stud $c^4$ is square where it fits slot $c^5$ and is provided with a collar in front and a nut back of arm $J'''$. The stud $c^4$ projects in front of collar and is circular in form, (Figs. 13—14 Sheet 5,) entering a vertical slot $c^6$ in upper part of arm J. The slot $c^6$ corresponds with slot $c^5$. A long thumb-screw $c^8$ passes through bottom of depending arm $J'''$ and upward through the squared portion of stud $c^4$ to the top of slot $c^5$, where it is guided; said thumb-screw $c^8$ freely passes through the opening in the bottom of arm $J'''$ and screws into and through the stud $c^4$. A pin is driven through the screw just inside of slot $c^5$ and holds said thumb-screw in the same position, so that by turning the same to the right or left the stud $c^4$ is raised or lowered in the slot $c^5$ as desired. The object of this adjustable stud is to accurately regulate the longitudinal movement of the rack bar M. The rock shaft $J'$ is mounted in bearings attached to frame and has from its under portion a series of depending curved arms $i i i i i$, &c. These arms are directed down and are located at regular intervals on shaft $J'$ corresponding with the distance between center of key bars G. There is one lever $i$ for each key bar and its position is at the side, and near said key bar. It is in the track of a stud I, projecting from same side of each key bar and in front of said lever, (Figs. 13 and 14, Sheet 5.) These arms or levers do not all lie in the same plane, as the ends are separated by one-tenth intervals, Fig. 1. The first lever in order would be the companion lever for the first key bar, the second lever for the second key bar, and so on for the whole number of levers and key bars. The normal position of the first lever is at the greatest distance horizontally from the stud I, the second lever would be one-tenth nearer, the third two-tenths, and so on until the tenth lever which would almost engage with stud I when both were in their normal position. As the first key bar G is operated and while performing the last one-tenth of its stroke it will engage with the first lever $i$ by the stud I and carry arm J and rack bar M to the front the distance of one cog. This would by the means of the pinion $2^5$, pawl $2^4$, shaft 2 and spring $2^6$, cause one-tenth of a revolution of the first (1st) registering wheel. The operation of the second key bar G would move the rack bar M two cogs, and the first registering wheel two tenths of a revolution, and so on to the tenth key and key bars, which would cause a complete revolution of said registering wheel.

As before noted the registering wheels are mounted on shaft 2. The hub of each wheel is wider that the rim, and there is a space between each wheel at the rim. In this space between wheels, first and second, second and third, third and fourth, is a ratch bar 5, (three in all.) This bar is above shaft 2 and at right angles with it. It is guided or supported near each end in bearings $a^4$ $a^4$, forming a part of frame 4. It is capable of a longitudinal movement in said bearings and this movement is produced by the action of the first registering wheel in the following manner: On the side of the ratch bar 5, facing the rear side of each registering wheel, is a short flat, projecting steel stud $a^6$ which (when the ratch bar 5 is in its normal position) is just in the rotary track of the stud $a^5$ of the first wheel, which, revolving toward the stud $a^6$ will engage its upper edge with the lower edge of $a^6$ and carry ratch bar 5 along with it, until, owing to the rotary motion of stud $a^5$ and the horizontal motion of ratch bar 5 and stud $a^6$, a line or point of departure $a^8$ is reached, and stud $a^5$ also engages with stud $a^6$ and will not again engage until said wheel has made another revolution. From the point of meeting to the point of departure $a^8$ the ratch bar 5 has moved in a forward direction a distance equal to one-tenth the circumference of registering wheel. On the side of ratch bar opposite the stud $a^6$ is a single projecting ratch tooth corresponding in shape, but in a reverse order, with the internal ratch teeth $2'$, $2'$, $2'$, $2'$, &c., of next wheel in the train. The vertical position of ratch bar 5 and abutment 7 is such that the abutting face of abutment 7 will engage with the corresponding faces of ratch teeth $2'$, $2'$, $2'$, &c. The abutment 7 projects inside of rim of wheel 2nd about to the web of said wheel, as does also the stud $a^6$, project from the opposite side almost to the web of first wheel (1st). Each ratch bar 5 slides in bearings $a^4$ $a^4$ in frame of register, and in its normal position rests against the upper inside of said bearings. In the left hand bearings $a^4$ there is a space of about one-sixteenth of an inch between the bottom of ratch bar 5 and bottom of bearing or guide, as shown at $b^4$, and in the right hand bearing or guide $a^4$ there is a similar space $b^5$ between top of ratch bar 5 and top of guide. This space $b^5$ does not continue clear through guide, as the ratch bar is increased in width just at entering point of guides. As the ratch is moved forward this addition to its width just fills the guide and it (the ratch bar) will be truly guided, as the bar will then occupy the whole space in said guide. See dotted lines $b^7$, Fig. 6, Sheet 3. A spring, $b^8$, is attached to right end of each ratch bar 5, and also with frame 4 of register. The tension of said spring is directed to bring its companion bar back to the starting point. When carried forward by the engagement between the studs $a^5$ and $a^6$ the abutment 7 will engage with one of the internal teeth 2', of its companion registering wheel $a$ and carry said wheel with it until the point of departure $a^8$ is reached; then as that spring $b^8$ has been elongated it has acquired power sufficient to return the particular bar to its original position. In accomplishing this the abutment 7 will (as it is returning) meet and pass under the next internal tooth 2' in rear of the one it has just left, and assume its position back of said tooth. The space at $b^5$ will allow the one end of ratch bar 5 to rise, and the space $b^4$ will permit the other end of bar to fall, thus giving freedom for the two abutments 7 and 2' to pass each other as the angular side of each meet when the bar is returning. It is plain that as the first registering wheel makes one complete revolution the second (2nd) wheel will make one-tenth of a revolution, and so on through the train. A complete record of wheels or when zeros are all up, will indicate ten thousand.

The first registering wheel is moved by the rack bar M; the second wheel by the first ratch bar, 5; the third wheel by the second ratch bar 5; the fourth wheel by the third ratch bar 5. A sharp pointed projection 6 extends from one end of each ratch bar 5. (I do not confine myself to placing this point 6 at one end for the reason that two points may be necessary. In that case I would have one point at each end to the ratch bar 5). The said points or projections are for making a record of each registering wheel's performance 1st, 2nd, 3rd and 4th. The record is made by pressing or punching the points 6 through a ribbon of paper $c^6$ suspended over and carried down in front of the pointed ends of bars 5. This paper $c^6$ is moved or actuated by a ratch wheel $c^7$ on roll 8, Sheet 1, Fig. 1. Said roll revolves by action of first wheel of registering train. Each time this first wheel makes a revolution, the paper is carried down a distance equal to the horizontal stroke of this first ratch bar 5. Said ribbon of paper $c^6$ in width includes all the points 6, and its relative vertical position is such that as the bars 5 are about completing their stroke, the point 6 will pierce or protrude through the paper, leaving in the same a punctured record of the stroke. When ten of these punctures are made by the first ratch bar 5, one will be shown by the second; ten of the second will show one of the third; and so on, if continued. This is for an absolute check on the operations of the register, so that if there has been any failure of performance by comparison, the record shown by dials and the difference in punctured record will at once show which wheel of register has been tampered with, or possibly out of order. The paper is supplied continuously from a roll and is long enough to complete the dial registration.

A detail sectional view of the connections between check arm H and rack bar M is shown in Fig. 14, Sheet 5, and shows clearly the adjusting mechanism for stud $c^4$. The indicating devices of the register consist of a row of vertical signal bars S S S S, &c., situated a certain distance back or in the rear of frame A'' of machine, and in number corresponding with the number of keys E E' and key bars G. Said signal bars are maintained in a vertical position by the standards $F^4$ and guides $F^5$ $F^5$. Above the upper guides $F^5$ each alternate signal bar is curved forward in front of the others and all signal bars carry indicating sights or signals at the upper end, and bear a number corresponding with the number on key operating it.

The perpendicular standards $F^4$, bearing the guides $F^5$ $F^5$ are secured to base A''' and receive the upper and lower portions of signal bars. The lower guide is above the lower end of signal bars enough to allow the signal sight to be displayed in the glass housing P, P, P, and still contain the bars.

A shaft or rod C', Fig. 1, is placed in rear of frame A'' at right angles with and over the ends of all the key bars G mounted in bearings at each end of frame A''. This shaft C' is the fulcrum, for a series of elbow levers C'' C'' C'' C'', &c., corresponding in number with the number of keys E E' or key bars G. There is one lever for each key bar, and all swing loosely on fulcrum C', with perpendicular or shorter leg extending down from fulcrum $c'$ in front of the rear end of its companion key bar G. The horizontal or longer leg of the lever $c'$ assumes a position at the side of its corresponding signal bar S, and is in near engagement with a projecting pin $c$ on side facing said lever, and over it. When the keys E E' are in their normal positions, the signals are all down and concealed, but should any key be depressed—suppose key E' bearing the number 4—its key bar G will engage with the short leg of the lever C'' and throw the longer leg up, together with its particular signal bar S, and expose to view the numbered signal 4, and so each key exposes its designating number.

At the rear of the center of frame, and just over all the key bars G G, is a continuous foot N; this extends at right angles with keys, and longitudinally with frame. It has for its bearings or axis the shaft $n$, and consists of a heel $n''$, a toe $b$ and a shank $n^4$. When in its normal position, or before a key is depressed, the heel $n''$ of this foot N will just clear or be free over the top of all the key bars G.

On the top of each bar G and just in front of the toe $b$ of the foot N, is a short vertical projecting steel engaging stud $n''$. When the foot N is in the position shown by dotted lines, Fig. 1, Sheet 1, (normal,) the toe $b$ will be elevated above the heel $n''$. As a key is depressed the stud $n'''$ will pass under the toe $b$ and engage with the heel $n''$, and as the motion is continued, will throw the top of the shank $n^4$, (or the upper portion of foot N,) above the axis $n$ to the opposite side of a spring-actuated V stop. This stop 2 is held down by the spring $2'$, which is in a fixed position in the frame $2'''$ and is also so constructed as to form the bearing upon the shaft $n$. The lower end of stop 2 is V-shaped, and the upper end of shank $n^4$ is also V-shaped with the apex up, and the stop 2 will rest on either side of the shank as it is moved to the right or left, the spring $2''$ holding the foot N with the toe up or down, as required by the operation of the machine. After a key has been depressed, the stud $m'''$ has engaged with and passed under the heel $n''$, throwing the shank $n^4$ to the left side of the stop 2, thus depressing the toe $b$, and said toe $b$ is held so depressed until the particular key bar G that depressed it is returned to its original position. While the toe $b$ is depressed no other key E or E' can be operated, as the stud $n'''$ would at once engage with toe $b$ and prevent its motion. In returning to its original position the stud $n'''$ that depressed the toe $b$ will raise it to its normal position for in the return movement, the stud $n'''$ will pass under the heel $n''$, engage with under side of toe $b$ and throw shank $n^4$ to the rear or right of stop 2, leaving a space between top of key bar and toe $b$ sufficient for the passage of stud $n'''$ back to its starting point. The object of the foot N and stop 2, is, to prevent the operation of more than one key at the same time. The foot N is a single continuous piece and its length covers all the key bars G G, &c. There is but one stop 2, and spring $2''$ for each machine. A long pawl $g$, Fig. 1, Sheet 1, has for its bearings the shaft or rod $g'$ and is mounted in supports attached to signal standards, the engaging end of pawl $g$ resting against the front side of all the signal bars S. This pawl or dog $g$ is continued down below its center or axis $g'$ for a short distance, and terminates with a right angle shoe $g''$ directed toward the heel of the foot N. Between the heel $n''$ of the foot N and the lower portion of the pawl $g$ is a short bar $g^4$. This bar at the end near the pawl $g$ rests on the shoe or foot $g'''$. The other end is guided through frame $A''$ and ends in near contact with the heel $n''$ of the foot N. The pawl $g$ is held in position by the spring $g^5$. As the key bar G is removed, or a key depressed, the corresponding right angle elbow lever C', will raise its companion signal bar S. As this ascends the lug S' passes under the dog $g$, resisting the pressure of the spring $g^5$. After the lug S' has passed the dog $g$, the said dog will assume its former position and prevent the signal bar S, (that has been raised,) falling again. While in this position the numbered signal is exposed to the glass housing P, P, P, P and will remain so exposed until another key E or E' is depressed, after the key bar G which raised the exposed signal has returned to its original position. When another key is depressed the heel $n''$ of the foot N will engage with the bar $g''$ and throw or trip this dog $g^4$ from the lug S' of the signal bar S and allow it to drop back to its former position, and so through the operation of all the keys, but one sight exposed, or the simultaneous exposure of two or more signals at the same time rendered it impossible.

There are combined in this machine, to prevent a bad or unjust use of the same, three mechanical safeguards: First, the action of the check arms H, H, H, &c., and pawls $f f$; second; the action of the stud $n'''$ with reference to foot N; third, the action of the foot N in connection with the pawl or dog $g$.

In addition to the keys above described and explained, is an extra key, a blank key R, Fig. 12, Sheet 4, corresponding with all the rest, with like connection through to cash drawer, consisting of link $e^7$, key bar G, check arm H operating mechanism for cash drawer, alarm bell, &c. This key R does not connect with register, as the long key $i^2$ on fulcrum shaft F does not extend through its hub. Consequently said key R does not move or vibrate the arm J. It is for the purpose of opening cash drawer for making change and for other purposes than recording sales. It restores all signals, rings the alarm bell and exposes a signal lettered O, indicating the open cash drawer.

A complete cash register may embrace three machines, the first machine having a range numerically from one to ten cents, the second machine from ten cents to one dollar, the third machine from one dollar to ten dollars.

A machine embracing but two keys, one for five cent, the other for ten cent sales, with a two wheel register, may be made for five and ten cent sales, such as cigar stands, soda fountains, &c.

The cash drawer B, Fig. 1, Sheet 1, is held in a closed position by means of a short lever B' having its forward end enlarged as at B'' and directed back to shank at B'''. B'''' is its fulcrum. The short end of lever B engages with the fork B⁵ attached to arm B⁶, and having nearly a vertical movement. As the spring arm H' is thrown to the right or left, the fork B⁵ will engage with the stud B⁷ and depress the short end of lever at B' and will raise the opposite end, B'', and allow the drawer to open. Said drawer can only be opened by the operation of one of the keys E E' or the extra key R. When necessary to open cash drawer for other purposes than recording sales, this key R must be used. A band cam-shaped brass spring, B⁸, opens the drawer B. Closing the drawer overcomes the resistance of spring B⁸, and the power is again stored to open said drawer.

B⁹ is a resistance post for spring B⁸. The rear end of drawer will pass under the abutment B″ at the same time that the check arm H has accomplished its full stroke, and will, at the same time strike the alarm bell B¹³, or in contrary direction, as may be elected.

F⁴ is the standard for guides F⁵ F⁵ and serves to retain the signal bars S S, &c., in their vertical positions.

A⁵ is one of the hinges for door opening in cabinet A, and A⁶ is a combination lock on said door that may be set anew each day if the owner desires. The hinged door in opening extends the entire length of cabinet A, and through it all parts are exposed, so that the position of the dials may be read, changes made, and all parts oiled if necessary.

The registering or adding device of this machine may be used as a registering or counting device for an engine or a machine.

Having thus explained my invention, and with drawings showing the same, so that any one skilled in the art may construct the same, I claim as new, and desire to secure by Letters Patent, the following:

1. In a cash register the combination with a shaft provided with a radially projecting key extending throughout a considerable portion of the length thereof, of a series of number bearing keys provided with hubs which loosely embrace said shaft and are provided with an annular recess to receive said key and permit a certain amount of lost motion between the key and shaft; a series of key-bars longitudinally movable in the frame of the machine, each of which has link connections with one of said keys, a series of vertically movable signal-bars bearing numbers corresponding to those upon said keys; a series of elbow-levers having one arm thereof underlying a projection on one of said signal-bars and having the other arm thereof adapted to be engaged by one of said key-bars as the latter moves in a rearward direction; and a spring operatively connected with said key supporting shaft and normally retaining said keys in their highest position, substantially as described.

2. In a cash register the combination with the horizontally movable key bar, vertically movable signal bar, and intermediate elbow-lever for transmitting the motion of the former to the latter, as described; of a pivoted dog adapted to engage said signal-bar and retain it in its highest position; a spring pressing said dog toward said signal-bars; a rocking foot pivotally supported above said key-bar and receiving movement from the latter in opposite directions, and an intermediate connection substantially as described between said foot and said dog, whereby movement of the former in one direction will move the latter to cause it to release the signal-bar, substantially as set forth.

3. In a cash register the combination with a series of horizontally movable key-bars, a series of vertically movable signal-bars, and a series of intermediate elbow-levers for transmitting the movement of the former to the latter, arranged and operating substantially as described; of a rocking foot extending transversely over said series of key-bars and adapted to have its toe and heel alternately engaged by projections on said bars, as either of the latter is moved in an opposite direction, a spring actuated V-shaped detent engaging a similar shaped projection on said foot, a spring actuated dog for retaining said signal-bars in their highest position, and a rod or similar device extending between the heel of said foot and said dog, whereby movement of the foot in a rearward direction will cause the dog to release any signal-bar with which it may be engaged, substantially as set forth.

4. In a cash register the combination with a vertically rocking key and a horizontally movable key-bar having link connections with said key; of a check-arm pivotally supported at or near one end and having its opposite end operatively connected with said key-bar, said check-arm having projecting from the opposite sides thereof two toothed sectors which are concentric to the pivot about which said arm revolves; two pawls pivoted to fixed supports and adapted to engage the teeth on said sectors, respectively, an intermediate rod or bar having pivotal connection at each end with one of said pawls and yielding intermediate connections between said check arm and said rod or bar; arranged and operating substantially as described, whereby, as the check arm moves in opposite directions, said pawls will be alternately engaged with and disengaged from their sectors, substantially as set forth.

5. In a cash register the combination with the series of rocking keys and horizontally movable key-bars arranged as described; of a shaft having mounted thereon in such a manner as to be capable of a uniform amount of lost motion, a series of check-arms, each of which arms is operatively connected at its free end with one of said key-bars and has projecting from opposite sides thereof two toothed sectors, two oppositely located series of pawls adapted to engage the teeth of said sectors respectively, the pawls of each series being connected together for movement in common, an intermediate rod or bar connecting one of the pawls of one series with a pawl of the opposite series, and an intermediate connection substantially as described, between said shaft and said rod or bar whereby as said shaft is rocked by the movement of one of said check-arms, said rod or bar will be shifted and the corresponding pawls of each of said series will be actuated to cause them to alternately engage the two sectors upon said check-arms, substantially as and for the purpose described.

6. In a cash register the combination with a series of keys and a series of horizontally movable key-bars actuated thereby, of a train of registering wheels, a longitudinally movable rack-bar and intermediate connections, substantially as described, whereby the movement of said bar in one direction will impart a partial revolution to one of the wheels of said train, a shaft carrying a series of arms, each of which projects into the path of movement of a projection on one of said key-bars, said shaft also having an arm which is operatively connected with said rack-bar, substantially as described, whereby movement of either of said key-bars will impart movement to said rack-bar and actuate said train of registering wheels, substantially as and for the purpose described.

7. In a cash register a series of keys and a series of key-bars actuated thereby, each of said key bars being provided with a lateral projection; a train of registering wheels; a rack-bar operatively connected with and actuating one of said wheels; a shaft carrying a series of depending arms projecting therefrom at varying angles, each of which lies in the path of movement of the lateral projection on one of said series of key-bars, said shaft also having an upwardly projecting arm and a radially adjustable connection, substantially as described, between said upwardly projecting arm and said rack-bar, combined and operating substantially as described.

8. In a cash register the combination with a series of keys and longitudinally movable key-bars actuated thereby, of a shaft provided with a series of depending arms corresponding in number with said series of key-bars and adapted to be engaged by projections on the latter with varying degrees of lost motion; said shaft being also provided with an upwardly projecting slotted arm, a train of registering wheels, a rack-bar operatively connected with and actuating said train, said rack-bar being provided with a depending arm, a vertically movable stud projecting from said arm into the slot in the arm on said shaft, and an adjusting screw mounted upon the arm of said rack-bar for varying the position of said stud, arranged and operating substantially as described.

9. In a cash register the combination with a key E or E' of a longitudinally movable key-bar G having link connections with said key; a check-arm H pivotally supported at its lower end and provided at its upper end with a slot which embraces a stud on said key-bar, toothed sectors L L' projecting from opposite sides of said check-arm, and having the passages O at their inner ends; pawls $ff$ pivotally supported between their ends and provided at their upper ends with a laterally projecting tooth to engage said sectors respectively, rod $f'$ connecting pawls together at their lower ends and intermediate connections, substantially as described between said check-arm and said rod, whereby the rocking movement of the former will impart longitudinal movement to the latter, substantially as and for the purpose described.

10. In a cash register the combination with the series of key-bars G, of shaft $h$ provided with arm H' carrying the flat spring $f''$, the series of check-arms H mounted upon said shaft in such a manner as to leave a uniform amount of lost motion, each of said arms being operatively connected at its upper end to one of the bars G and carrying oppositely projecting toothed sectors L L', two series of interconnected pawls $ff$ adapted to engage said sectors respectively, and rod $f'$ connecting a pawl of one series with one of the opposite series, said rod having operative engagement between its ends with said spring $f''$, arranged and operating substantially as set forth.

11. In a cash register the combination with the rocking keys E or E' and the horizontally moving key-bars G actuated thereby and provided with the studs $n'''$ of the vertically moving signal bars S, the series of elbow-levers C'' having one arm thereof operatively engaged with said signal bars respectively, and having their opposite arms adapted to be engaged by the ends of said key-bars, the foot N pivotally supported above said key-bars, said foot being provided with the toe $b$ and heel $n''$ and having the V-shaped shank $n^4$ and the spring actuated stop 2 engaging said shank $n^4$ arranged and operating substantially as described.

12. In a cash register the combination with keys E or E', key-bars G, signal-bars S, elbow-levers C'' and foot N arranged and operating substantially as described; of the dog $g$ pivotally supported adjacent to the signal bars and adapted to hold them temporarily in an elevated position, said dog being provided with the depending shoe $g'''$ and bar $g^4$ bearing at one end against said shoe, and at its opposite end against the foot N, substantially as and for the purposes described.

13. In a cash register the combination with the series of keys E or E' and key-bars G, of the train of registering wheels $a$ and rack-bar M for imparting motion to one of said wheels, said rack-bar being provided with the depending slotted arm J''' and with the vertically adjustable stud $c^4$ mounted upon said arm, shaft J' extending transversely over said bars G, said shaft being provided with the slotted arm J which embraces the stud $c^4$ on the rack-bar, and with the series of depending arms $i$ projecting therefrom at a uniformly varying angle to a vertical line drawn through the axis of said shaft, each of said depending arms lying within the path of movement of a projection upon one of said key-bars G, arranged and operating substantially as set forth.

14. In a cash register the combination with the series of keys E or E', corresponding key-bars G, check-arms H, shaft $h$ and arm H', fork $B^5$, lever B' and stop $B^2$ of cash drawer B, a cam shaped band spring $B^8$ with resistance post $B^9$, spring standard $B^{10}$ and horizontal bell striking lever $B^{14}$, having its connection to lever B' and its power applied through link $B^{15}$ connectedly attached to base A''', all substantially as set forth.

EDGAR P. HOLLY.

Witnesses:
W. H. CHAPMAN,
ALVIN M. CUSHING.